(12) United States Patent
Jiang

(10) Patent No.: US 7,115,835 B1
(45) Date of Patent: Oct. 3, 2006

(54) WELDING ELECTRODE DRIVING SYSTEM

(76) Inventor: Qi Fen Jiang, 75 Springbrook Drive, Richmond Hill, Ontario (CA) L4B 3R3

( * ) Notice: Subject to any disclaimer, the term of this patent is extended or adjusted under 35 U.S.C. 154(b) by 0 days.

(21) Appl. No.: 11/183,518

(22) Filed: Jul. 19, 2005

(51) Int. Cl.
*B23K 9/133* (2006.01)

(52) U.S. Cl. .................................. 219/137.2

(58) Field of Classification Search ............. 219/137.2, 219/137.31, 137.61, 137.7, 136, 145.31
See application file for complete search history.

(56) References Cited

U.S. PATENT DOCUMENTS

| | | | | |
|---|---|---|---|---|
| 2,133,970 A | * | 10/1938 | Magnus et al. | 219/145.31 |
| 5,488,217 A | * | 1/1996 | Ni | 219/137.31 |
| 5,603,855 A | * | 2/1997 | Ni | 219/137.31 |

* cited by examiner

*Primary Examiner*—Clifford C. Shaw
(74) *Attorney, Agent, or Firm*—David W. Wong

(57) ABSTRACT

Two slidable carriages of identical construction are slidably mounted in a welding device side by side and move alternately 180 degrees out of phase with each other in a linear reciprocating movement. Pivotal gripping plates are mounted on the slidable carriages which alternately clamp on selected gaps between flux coating sections of the welding electrode to advance it continuously towards the work piece. Crank shafts are incorporated in the welding device to produce the linear reciprocating movement of the two slidable carriages, and cam wheels and pivotal bars are provided to locate alternately one group of gripping plates in the closed position to carry the welding electrode forward while the other group of gripping plates are in the opened position to facilitate the welding electrode to advance.

11 Claims, 4 Drawing Sheets

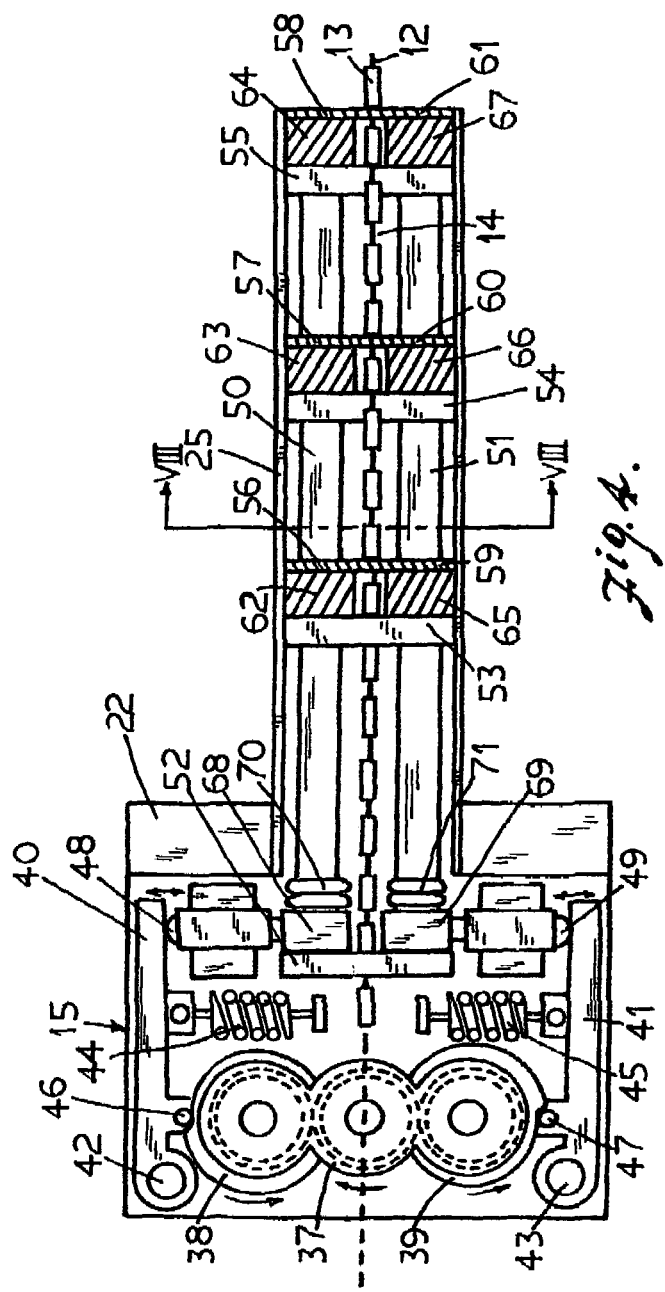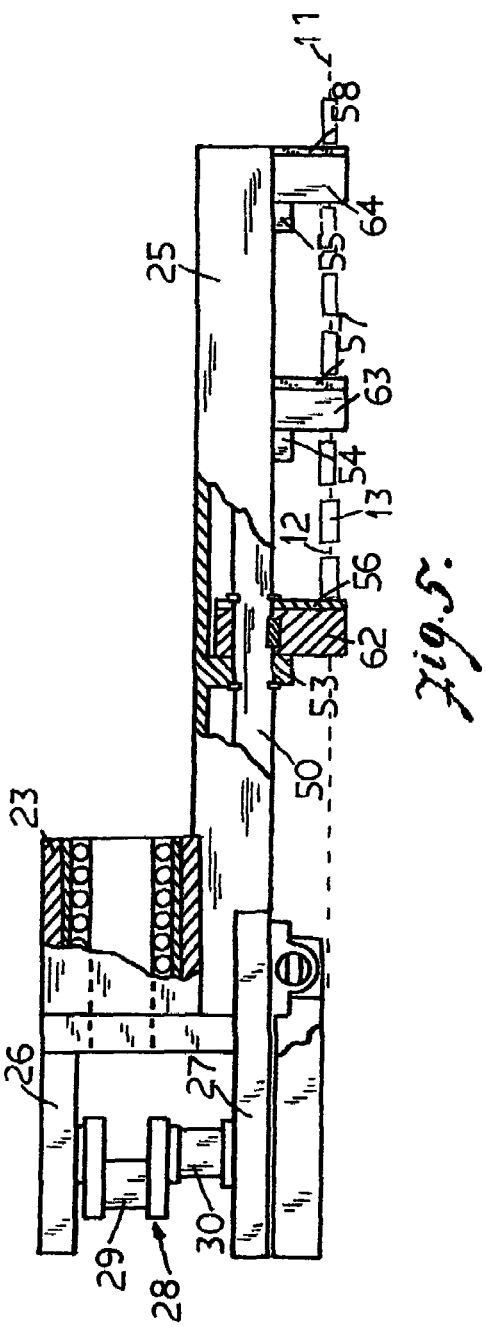

WELDING ELECTRODE DRIVING SYSTEM

BACKGROUND OF THE INVENTION

1. Field of the Invention

This invention relates to a driving system of a welding device for a continuous welding electrode having open gaps formed in its flux coating. The welding device is operative for carrying out continuous welding operation.

2. Background Art

Continuous welding operation is required to obtain a high quality welding continuously without any intermission. The weld has a strong bond to the work piece and it has a high quality and a desirable smooth surface. Continuous welding operation is carried out by a welding device which advances a continuous welding electrode towards the work piece as well as supplying a high welding current for the operation. The high welding current is supplied to the welding core through open gaps formed in the flux coating on the continuous welding electrode. The welding device also drives the continuous welding electrode towards the work piece in cooperation with these open gaps. Commonly, a complex chain driven mechanism or a series of circulating drive members are provided in the welding device for the above purposes. In the chain drive mechanism a plurality of fingers are provided in evenly spaced positions on a circulating continuous chain. The fingers engage with the same evenly spaced open gaps of the welding electrode to drive it forward towards the work piece. While in the latter system, a series of drive members are circulated continuous through a continuous circulation channel formed adjacent to the welding electrode feeding channel. The drive members have fingers engaging with the open gaps of the welding electrode to drive it towards the work piece. However, both such continuous welding electrode advancing systems are problematic in that the chain in the chain drive system often become slacken due to wear while the series of circulating drive members in the latter case cause rapid wear of the circulation channel as well as the drive members themselves. Therefore, both such known continuous welding electrode driving systems are prone to jamming. Furthermore, such known systems are relatively slow in their operation despite of their complex construction.

SUMMARY OF THE INVENTION

It is a primary object of the present invention to provide a reciprocating drive system for a welding device of a continuous welding electrode.

It is another object of the present invention to provide a welding electrode driving system which is not subject to jamming.

It is another object of the present invention to provide a welding electrode driving system which is efficient in operation.

It is yet another object of the present invention to provide a welding electrode driving system which may be easily disassembled for maintenance or components replacement purposes.

It is still another object of the present invention to provide a welding electrode driving system which is relative simple in construction and cost effective in fabrication.

BRIEF DESCRIPTION OF THE DRAWINGS

FIG. 4 is a partial sectional side elevation view of the left slidable carriage of the welding electrode driving system according to the present invention.

FIG. 5 is a partial sectional top elevation of the left slidable carriage with the rotatable crank shaft mounted thereon.

DETAILED DESCRIPTION OF THE PREFERRED EMBODIMENTS

Figure 1:
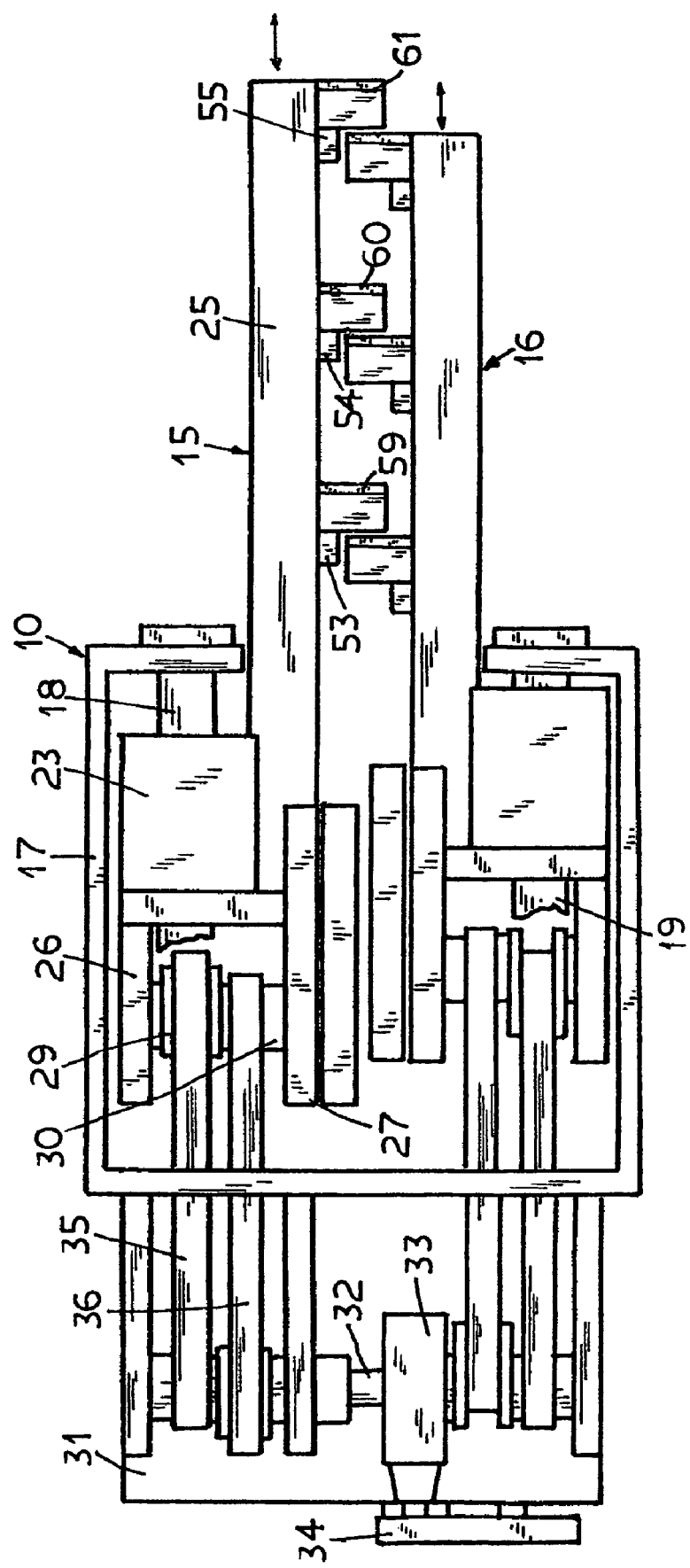
FIG. 1 is a perspective top elevation view of the welding device having the welding electrode driving system according to the present invention.
Figure 2:
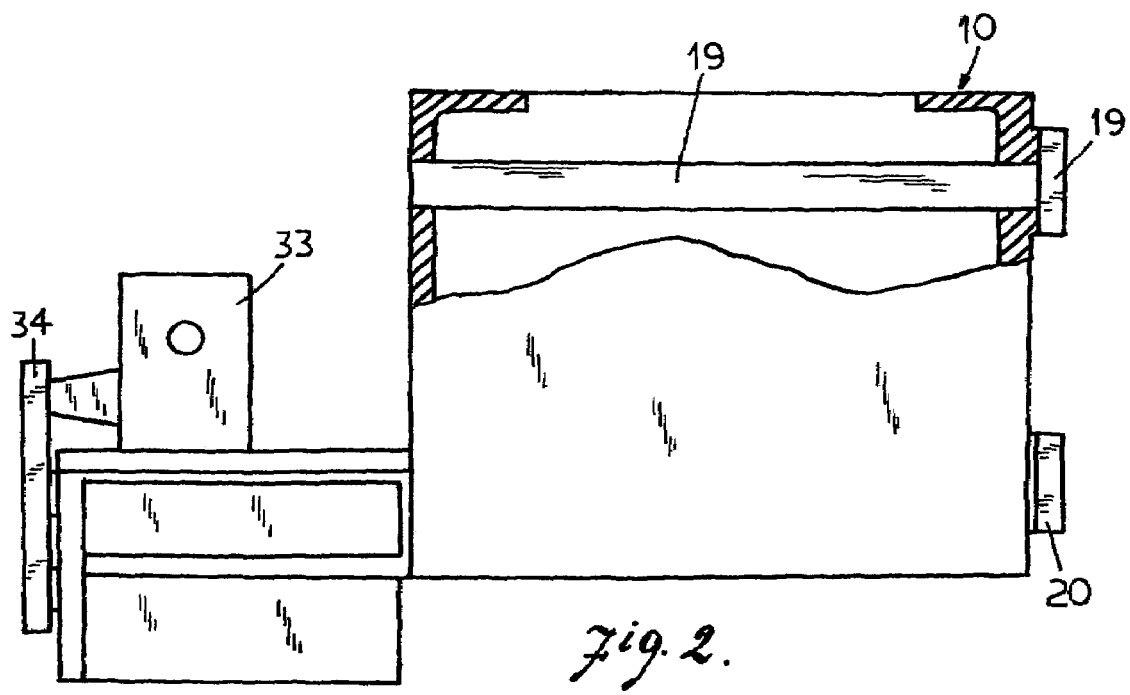
FIG. 2 is a partially sectional perspective side elevation view of the enclosure of the welding device with the slidable carriage mounting rod.
Figure 3:
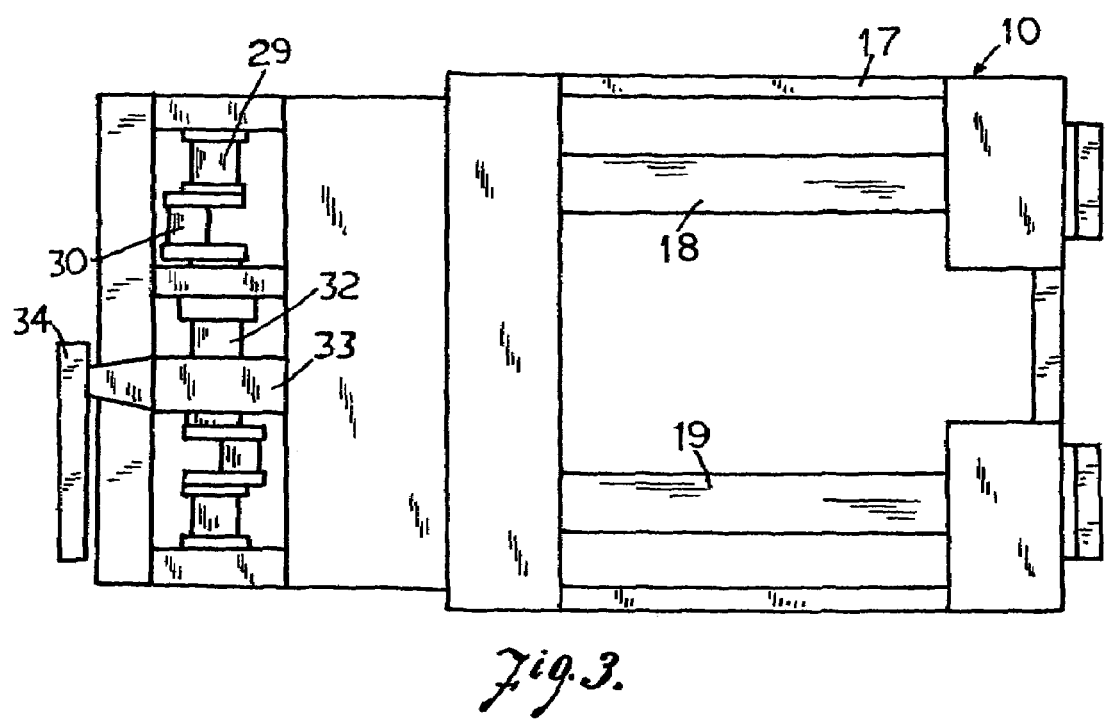
FIG. 3 is a perspective top elevation view of FIG. 2 showing the crank shafts.
Figure 8:
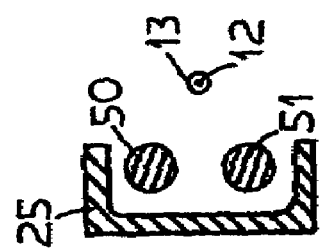
FIG. 8 is a sectional view along section line VIII—VIII of FIG. 4.
Figure 6:
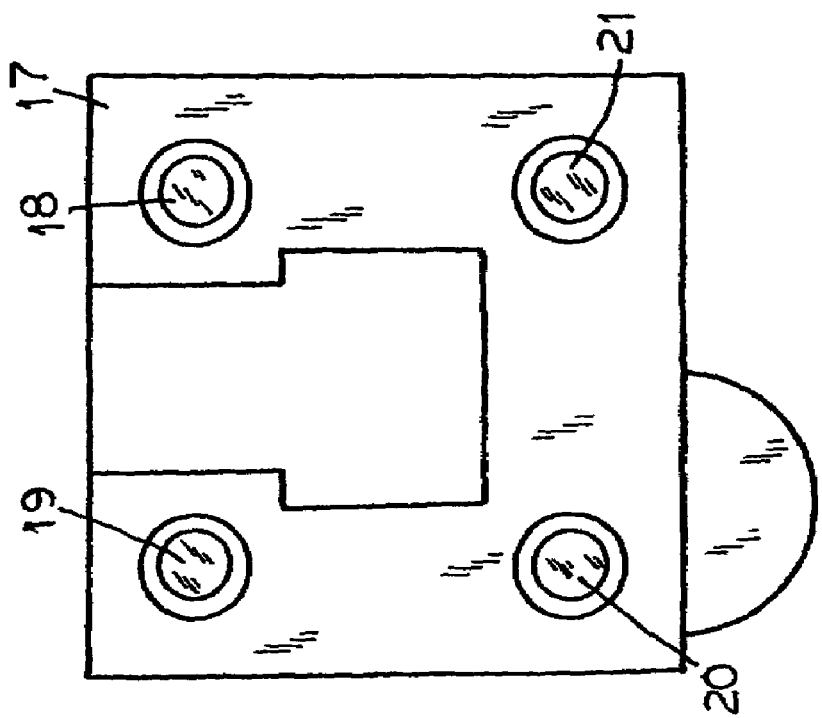
FIG. 6 is an perspective front end view of the enclosure of the welding device shown in FIG. 2.

With reference to the drawings wherein like reference numerals designate corresponding parts in the several views, a welding device 10 having a electrode driving system according to the present invention is best shown in FIG. 1. The welding electrode 11 is a continuous welding electrode having a welding flux coating formed on the outer surface of a metal core 12. The flux coating has short flux sections 13 evenly spaced from neighboring sections by gaps 14 of an equal distance. Such continuous welding electrode 11 enables the welding operation to be carried out in a continuous manner to provide a high quality weld having a smooth surface. Two slidable carriages, namely a left slidable carriage 15 and a right slidable carriage 16 are slidably mounted to the enclosure 17 by two upper mounting bolts 18 and 19, and two lower mounting bolts 20 and 21 respectively as best shown in FIGS. 1, 2, 3 and 6. The left slidable carriage 15 and the right slidable carriage 16 are identical in construction but having different lengths; namely, in the example shown, the left slidable carriage 15 is longer than the right slidable carriage 16 by one flux section 13 plus one gap 14. The construction of the left slidable carriage 15 is shown in FIGS. 4, 5, 7 and 8 and described herein in detail. The slidable carriage has a main body portion 22 having an upper ball bearing sleeve 23 and a lower ball bearing sleeve 24 located on the outer left side of the main body portion 22 and extending horizontally and parallel to one another. The mounting bolts 18 and 21 are inserted through the upper ball bearing sleeve 23 and lower ball bearing sleeve 24 for slidably mounting the slidable carriage to the enclosure 17 of the welding device 10. An elongated casing 25 extends outwardly and forwardly from the middle of the front edge of the main body portion 22. The elongated casing 25 has a generally C-shaped cross sectional shape as best shown in FIG. 6. The main body portion 22 has two parallel rearwardly extending side walls 26 and 27 with a rotatable crank shaft 28 rotatably mounted thereto. The rotatable crank shaft 28 has a drive shaft 29 and an offset rotary shaft 30. The mounting between the offset rotary shaft 30 and the side wall 27 is such that the rotational movement of the offset rotary shaft 30 will transform into a linear reciprocating movement of the main body portion 22 relative to the mounting bolts 18 and 21.

Figure 7:
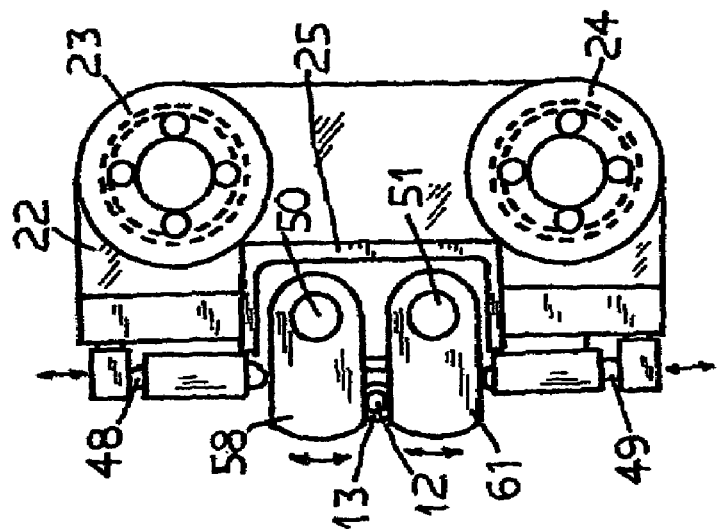
FIG. 7 is a perspective front end view of the welding device as shown in FIG. 4.

A drive housing 31 is located at the rear of the enclosure 17 a drive crank shaft 32 is rotatably mounted in the drive housing 31 and it is coupled to a speed controlling gear box 33 which is, in turn, coupled to the driving gear 34 rotatable by an electric motor (not shown). Coupling rods 35 and 36 are linked between the rotatable crank shaft 28 and the drive crank shaft 32, so that rotation of the drive crank shaft 32 by the stepping motor will cause the offset crank shaft 30 to rotate accordingly for imparting the reciprocating motion of the main body portion 22. In the meantime, the stepping motor will also initiate a drive wheel 37 mounted horizontally on the opposite side of the main body portion 22 as shown in FIG. 4. The rotation of the drive wheel 37 will cause two cam wheels 38 and 39 to rotate in the same direction. Two pivotal arms 40 and 41 are pivotally mounted in a cantilever manner on the main body portion 22. These pivotal arms 40 and 41 are pivotable relative to the mounting pins 42 and 43 respectively and they are normally maintained in a horizontal position parallel to one another by two tension springs 44 and 45 respectively mounted between the pivotal arms 40 and 41 and the main body portion 22. At the normal position, abutment pins 46 and 47 provided on the pivotal arms 40 and 41 are in contact engagement with the periphery edge of the cam wheels 38 and 39 and the free end portion of the pivotal arms 40 and 41 abut two slider pins 48 and 49 slidably mounted on the main body portion 22. Two elongated rotatable bars 50 and 51 are rotatably mounted in the elongated casing 25 in a mutually parallel manner by support bearings 52, 53, 54 and 55. Three gripping plates 56, 57 and 58, and 59, 60 and 61 are mounted on the rotatable bars 50 and 51 respectively as shown in FIGS. 4, 5 and 7 adjacent to the support bearings 52, 53, 54 and 55. The gripping plates 56, 57 and 58 are reinforced by support blocks 62, 63 and 64, the gripping plates 59, 60, and 61 are reinforced by support blocks 65, 66 and 67 respectively.

Two pivotal rods 68 and 69 are respectively mounted on the rotatable bars 50 and 51 adjacent to the end support bearing 52, and torsion springs 70 and 71 are mounted between the pivotal rods 68 and 69 and the rotatable bars 50 and 51 respectively. The pivotal rods 68 and 69 abut the slider pins 48 and 49. When the slider pins 48 and 49 are pushed inwards by the pivotal arms 40 and 41, the slider pins 48 and 49 will push the pivotal rods 68 and 69 respectively to turn the rotatable bars 50 and 51 accordingly. The turning of the rotatable bars 50 and 51 will, in turn, turn the gripping plates 56 and 59, 57 and 60, and 58 and 61 away from one another to an open position. Continue rotation of the cam wheels 38 and 39 will subsequently return the pivotal arms 40 and 41 to the parallel horizontal positions to release the pushing force on the slider pins 48 and 49, therefore the tension springs 44 and 45 and the torsion springs 70 and 71 will turn the rotatable bars 50 and 51 back to the original position. The gripping plates 56 and 59, 57 and 60, and 58 and 61 will accordingly return to a closed position adjacent to one another as shown in FIG. 7. At the closed position, the gripping plates will grip the metal core of the welding electrode through its gaps 14, while at the open position, the gripping plates will release its grip on the welding electrode to allow it to advance forward. The gripping plates will be at the closed position when the left slidable carriage 15 is in the forward moving stage in its reciprocating motion so that the welding electrode 11 is advanced forward by the left slidable carriage 15.

As shown in FIG. 1 the right slidable carriage 16 is identical in construction and operation to the left slidable carriage 15 but are 180 degrees out of phase with one another; namely the left slidable carriage 15 is one flux section 13 plus one gap 14 longer than the right slidable carriage 16 such that gripping plates of the left slidable carriage 15 and right slidable carriage 16 are located at alternate gaps 14 of the welding electrode 11. Thus, the gripping plates on the right slidable carriage 16 are at the open position when the right slidable carriage 16 is in the return moving stage while the left slidable carriage 15 is at the forward moving stage with the gripping plates in the closed position, so that the welding electrode 11 is advanced forward by the left slidable carriage 15; and when the right slidable carriage 16 is in the forward moving stage with its gripping plates located in the closed position, the left slidable carriage 15 will be in the rearward moving stage with its gripping plates at the open position, so that the welding electrode is advanced forward by the right slidable carriage 16. In this manner, the welding electrode 11 is continuously advanced alternately by the left slidable carriage 15 and the right slidable carriage 16 by their reciprocating movement.

While this invention is susceptible of embodiment in different forms, the drawings and the specification illustrate preferred embodiments of the invention, with the understanding that the present disclosure is to be considered as an exemplification of the principles of the invention, and the disclosure is not intended to limit the invention to the particular embodiments described.

What is claimed is:

1. A driving system for a welding device for use with a continuous welding electrode having equally spaced flux coating sections provided on a metal core comprising:

a first slidable carriage and a second slidable carriage mounted within said welding device, said first slidable carriage and second slidable carriage being movable alternately in a linear reciprocating movement, first group of gripping plates mounted on said first slidable carriage, and being operative in a closed position to clamp on said metal core at selected gaps of said welding electrode when said first slidable carriage is in an advance movement in said reciprocating movement, and alternately in an opened position to release clamping of said welding electrode when said first slidable carriage is in a rearward movement in said reciprocating movement, second group of gripping plates mounted on said second carriage, and being operative in a closed position to clamp on said metal core at selected gaps of said welding electrode when said second slidable carriage is in an advance movement in said reciprocating movement while said first slidable carriage is in said rearward movement, and alternately in an opened positions to release clamping of said welding electrode when said second slidable carriage is in a rearward movement in said reciprocating movement while said first slidable carriage is in said advance movement.

2. A driving system according to claim 1 including a crank shaft rotatably mounted in said welding device, said crank shaft having offset crank shaft portions slidably mounted to said first slidable carriage and said second slidable carriage, and being operative to cause said first slidable carriage and said second slidable carriage to move alternately in said linear reciprocating movement.

3. A driving system according to claim 2 including a first elongated rotatable bar and a second elongated rotatable bar mounted in said first slidable carriage, said first group of gripping plates being mounted on said first elongated rotatable bar and said second elongated bar, first pair of cam wheels mounted on said first slidable carriage, said first pair of cam wheels being rotatable to turn said first elongated rotatable bar and said second elongated rotatable bar in said first slidable carriage to operate said first group of gripping plates in said closed position and said open position alternately corresponding to stages when said first slidable carriage is in said advance movement and rearward movement respectively.

4. A driving system according to claim 3 including a third elongated rotatable bar and a fourth elongated rotatable bar rotatably mounted in said second slidable carriage, said second group of gripping plates being mounted on said third elongated bar and said fourth elongated bar, a second pair of cam wheels mounted on said second slidable carriage, and being operative to turn said third elongated rotatable bar and said fourth elongated rotatable bar to operate said second group of gripping plates in said closed position while said first group of gripping plates is in said opened position and said second slidable carriage is in said advance movement, and said second group of gripping plates being in said opened position when said first group of gripping plates is in said closed position while said second slidable carriage is in said rearward movement.

5. A driving system for a welding device for use with a continuous welding electrode having equally spaced flux coating sections provided on a metal core, comprising:

a first slidable carriage slidably mounted on a first mounting bolt in an enclosure of said welding device, said first slidable carriage having a main body portion and an elongated casing extending from a middle position of a front edge of said main body portion, a second slidable carriage slidably mounted on a second mounting bolt in said enclosure and located in parallel to said first slidable carriage, said second slidable carriage having a construction identical to said first slidable carriage, a first crank shaft mounted rotatably in said enclosure and said first slidable carriage, and being operative to cause a linear reciprocating movement of said first slidable carriage, a second crank shaft mounted rotatably in said enclosure and said second slidable carriage, and being operative to cause a linear reciprocating movement of said second slidable carriage, a third crank shaft mounted in said enclosure, connecting rods mounted between said first crank shaft and said third crank shaft and between said second crank shaft and said third crank shaft whereby operation of said third crank shaft cause said first slidable carriage and said second slidable carriage to move alternately in opposite directions in said linear reciprocating movement, a first elongated rotatable bar rotatably mounted in said elongated casing of said first slidable carriage, a second elongated rotatable bar rotatably mounted in said elongated casing of said first slidable carriage and located mutually parallel to said first elongated rotatable bar, a first group of gripping plates mounted on said first elongated rotatable bar and said second elongated rotatable bar and operative to grip said welding electrode at selected gaps therein when said first slidable carriage is in said advance movement, and releasing grip of said welding electrode when said first slidable carriage is in said rearward movement, a third elongated rotatable bar rotatably mounted in said elongated casing of said second slidable carriage, a fourth elongated rotatable bar rotatably mounted in said elongated casing of said second slidable carriage and located mutually parallel to said third elongated rotatable bar, a second group of gripping plates mounted on said third elongated rotatable bar and said fourth elongated rotatable bar, and being operative to grip said welding electrode at selected gaps therein when said second slidable carriage is in said advance movement while said first slidable carriage is in said rearward movement, and releasing grip of said welding electrode when said second slidable carriage is in said rearward movement while said first slidable carriage is in said advance movement.

6. A driving system according to claim 5 including a first pair of cam wheels rotatably mounted on said first slidable carriage and operative to turn said first elongated rotatable bar and said second elongated rotatable bar to cause said first gripping plates to position in said closed position and opened position alternately corresponding to advance movement and rearward movement respectively of said first slidable carriage.

7. A driving system according to claim 6 including a second pair of cam wheels rotatably mounted on said second slidable carriage and operative to turn said third elongated rotatable bar and said fourth elongated rotatable bar to position said second group of gripping plates in said closed position when said second slidable carriage is in said advance movement while said first slidable carriage is in said rearward movement, and to position said second group of gripping plates in said opened position when said second slidable carriage is in said rearward movement while said first slidable carriage is in said advance movement.

8. A driving system according to claim 7 including a first pair of pivotal bars in contact engagement with said first pair of cam wheels, a first pair of slider pins in contact engagement with said first pair of pivotal bars, a first pair of pivotal rods mounted on said first elongated rotatable bar and said second elongated rotatable bar and being in contact engagement with said first pair of slider pins and operative to turn said first elongated rotatable bar and said second elongated rotatable bar by rotating said first pair of cam wheels to position said first group of gripping plates in said closed position and said opened position alternately.

9. A driving system according to claim 8 including a second pair of pivotal bars in contact engagement with said second pair of cam wheels, a second pair of slider pins in contact engagement with said second pair of pivotal bars, a second pair of pivotal rods mounted on said third elongated rotatable bar and said fourth elongated rotatable bar and being in contact engagement with said second pair of slider pins and operative to turn said third elongated rotatable bar and said fourth elongated rotatable bar by rotating said second pair of cam wheels to position said second group of gripping plates in said closed position and said opened position alternately.

10. A driving system according to claim 9 including a first pair of tension springs mounted between said first pair of pivotal bars and operative to return said first pair of pivotal bars to a normal position to release pushing force on said first pair of slider pins, a second pair of tension springs mounted between said second pair of pivotal bars and operative to return said second pair of pivotal bars to a normal position to release pushing force on said second pair of slider pins.

11. A driving system according to claim 10 including a first pair of torsion springs mounted on said first elongated rotatable bar and said second elongated rotatable bar and operative in cooperation with said first pair of tension springs for turning said first elongated rotatable bar and said second elongated rotatable bar to return said first group of gripping plates from said opened position to said closed position, and a second pair of torsion springs mounted on said third elongated rotatable bar and said fourth elongated rotatable bar and operative in cooperation with said third elongated rotatable bar and said fourth elongated rotatable bar to return said second group of gripping plates from said opened position to said closed position.

* * * * *